United States Patent
Aviani et al.

(10) Patent No.: US 7,624,190 B1
(45) Date of Patent: *Nov. 24, 2009

(54) METHODS AND APPARATUS FOR INSERTING DATA INTO A COMMUNICATIONS SESSION

(75) Inventors: James A. Aviani, Santa Barbara, CA (US); Kenneth Earl Mueller, II, Santa Barbara, CA (US); Jean-Philippe Champagne, Goleta, CA (US); Mark Ting, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 11/297,771

(22) Filed: Dec. 8, 2005

Related U.S. Application Data

(63) Continuation of application No. 10/044,216, filed on Nov. 20, 2001, now Pat. No. 6,976,085.

(51) Int. Cl.
*G06F 15/16* (2006.01)
(52) U.S. Cl. .................. 709/234; 709/232; 709/246
(58) Field of Classification Search .......... 709/232, 709/234, 246
See application file for complete search history.

(56) References Cited

U.S. PATENT DOCUMENTS

| | | | | |
|---|---|---|---|---|
| 5,931,916 A | * | 8/1999 | Barker et al. | 709/239 |
| 7,072,933 B1 | * | 7/2006 | Lamb et al. | 709/203 |
| 2002/0059428 A1 | * | 5/2002 | Susai et al. | 709/227 |

* cited by examiner

*Primary Examiner*—Larry D Donaghue
*Assistant Examiner*—Brian J Gillis
(74) *Attorney, Agent, or Firm*—Patterson & Sheridan, LLP

(57) ABSTRACT

Mechanisms and techniques provide a system that operates in a data communications device such as a switch or a router to provide a technique for inserting data into packets associated with a communications session between a first and second computerized devices. The technique comprises receiving a first packet containing data being propagated from the first computerized device to the second computerized device in the communications session and inserting a first amount of extra data into the first packet to alter the size of the first packet and forwarding the first packet including the first amount of extra data to the second computerized device. By monitoring and adjusting sequence and acknowledgement information from with in the data communications device, data can be inserted into packets without disrupting connection state information maintained by and expected by each computerized device.

20 Claims, 5 Drawing Sheets

METHODS AND APPARATUS FOR INSERTING DATA INTO A COMMUNICATIONS SESSION

CROSS REFERENCE TO RELATED APPLICATIONS

This Patent Application is a Continuation of U.S. patent application Ser. No. 10/044,216 filed on Nov. 20, 2001, now U.S. Pat. No. 6,976,085 entitled, "METHODS AND APPARATUS FOR INSERTING DATA INTO A COMMUNICATIONS SESSION", the contents and teachings of which are hereby incorporated by reference in their entirety.

BACKGROUND OF THE INVENTION

Computer and communications networks such as the Internet allow computer systems to exchange information using various data communications protocols. One common protocol in widespread use that provides for a reliable exchange of information in packets between computer systems in such a network is the Transmission Control Protocol or TCP. TCP is a connection oriented protocol that allows two computer systems to each maintain a connection state for a communications session that uses an underlying protocol such as the Internet Protocol (IP) at the network layer to deliver packets between the two computer systems involved in the communications session. The connection state maintained by each computer system according to TCP supports reliable delivery of the packets by detecting, for example, loss or corruption of a particular packet in the communications session, or the arrival of packets out of order from the order in which they were sent from the sending computer system, or the arrival of duplicate packets that might be received by the computer system involved in a TCP communications session.

At the beginning of a TCP communications session between two computer systems, the computer systems exchange certain TCP synchronization, synchronization acknowledgment and synchronization acknowledgment messages which allow those computer systems to begin the TCP communications session at the same starting point. The initiation procedure thus allows each computer to thereafter properly track and update the TCP connection state based on the transmission and receipt of packets sent and received during that TCP session that contain certain TCP specific information. In particular, each packet transmitted as part of the TCP communications session between the computer systems includes a TCP header portion that identifies, among other things, sequence information in the form of a sequence number for that packet. Each byte of data transmitted by a computer system for that TCP session has a unique sequence number. The sequence number portion of a TCP header is sufficiently long (e.g., 32 bits) such that duplicate sequence numbers will long since have vanished by that time the sequence of sequence numbers must wrap around to start over. Accordingly, when a computer system places data into a packet to be transmitted using the TCP communications session, the sequence number is updated immediately prior to transmission of that packet to reflect the current total number of bytes of data transmitted from this computer system thus far during this TCP communication session.

A TCP header for a packet transferred during a TCP communications session can also contain acknowledgment information in the form of a numerical acknowledgment that allows the computer sending an outbound packet to acknowledge receipt of a cumulative number of total bytes of data received thus far including a most recent former inbound packet sent from the other computer system in the communications session. In other words, sequence number information in TCP header identifies the current byte count of bytes transmitted from a computer system whereas acknowledgment number information provides an acknowledgment to the other computer system of how many bytes have actually been received thus far by this computer system. Accordingly, a computer system involved in a TCP communications session can use acknowledgment and sequence number information to detect corrupted or lost data. In such cases, a computer system can retransmit a packet of data for which an acknowledgment is either not received or which indicates an incorrect amount of data that was received based on comparison of the acknowledgment information with the sequence number information.

In addition to sequence and acknowledgment information, the TCP header portion of a packet associated with a TCP communications session also contains error correction information in the form of a checksum value which is computed based on the entire contents of the packet. A computer system involved in a TCP communications session that receives a packet can access the checksum value to compare this value with a checksum computed during receipt of the packet to ensure that the packet was properly received. The TCP header can also contain a TCP header length field that identifies how much data is in this particular packet (or in this TCP header).

Using the aforementioned information within a TCP header, if a computer system involved in a TCP communications session transmits a packet containing a valid TCP header and that packet experiences corruption (e.g., an error or change in the packet information is introduced during its transmission) as it travels through the computer network from the sending computer system to a recipient computer system, the communications session state maintained by the sending and recipient computer systems can be used by TCP to detect this disruption using the aforementioned techniques. It may be the case, for example, that a noisy transmission link over which the packet traveled on route to the recipient computer system altered one or more bits settings within the packet or introduced additional data into the packet or removed existing data within the packet. As a result, the recipient computer system might detect a checksum error or alternatively, might detect that the sequence number specified in the TCP header for that packet does not properly correspond with the number of bytes received in a packet.

SUMMARY OF THE INVENTION

Due to the robustness of connection oriented communications protocols such as TCP, such protocols do not allow for the conventional modification of the contents of one or more packets of data being transmitted through a computer network using one of these protocols. This is often cited as a security feature within the TCP protocol since conventional attempts at modification of packet data for packets transferred using the TCP protocol result in the disruption of sequence and acknowledgment information and error correction or checksum information associated with the connection state of the communications session using the TCP protocol. As a result of this difficulty, applications that desire to insert additional data into a communications session or to modify existing data transferred between two upper layer software applications operating on computer systems involved in a TCP communications session must be performed within either the sending or receiving computer system prior to the creation of the TCP packet header so as not to interfere with this protocol. That is, mid-stream or post-transmission modifications to TCP packets as those packets propagate through a computer network are typically not performed or allowed by conventional data communications devices or data transmission systems so as to not disrupt the TCP communications session state required or expected by the end computer devices that share the connection.

Embodiments of the invention however provide techniques and mechanisms that allow data insertion or modification of data in one or more packets associated with a TCP communications session. Such modifications can take place in "midstream" during the lifetime or propagation of that packet (e.g., during its transmission) through a computer network such as the Internet on route to its destination. In particular, embodiments of the invention allow a device, such as a data communications device (e.g., switch, router, hub, bridge, gateway, and so forth) which assists in propagating or transporting a TCP packet through a computer network to insert or otherwise modify data in the data payload or other portions of the TCP packet without disrupting the TCP communications session state maintained by the sending and receiving computer systems that are exchanging this TCP packet. As a result of embodiments of the invention, the sending computer system can transmit a packet of data over a TCP communications session and a data communications device equipped with an embodiment of the invention can intercept and modify the contents of that packet such as, for example, by adding data or other information to the packet, and can then forward that packet on to the original recipient computer system. As will be explained, the sending and recipient computer systems need not require any knowledge that any modification was made to the packet from its original form. In other cases, one or both of the sending and recipient computer systems can be equipped with knowledge that such a modification can be made packets in the communications session such that those computer systems can use the modifications to the packets for explicit purposes.

As an example of the usefulness of embodiments of the invention, a data communications device equipped with an embodiment of the invention can, for instance, intercept a packet associated with a TCP communications session and can encode or otherwise insert geographical or physical location information into the original TCP packet. This may, for example, increase the size of the original packet by a certain number of bytes. Prior to retransmission of this packet further towards its intended recipient computer system, the data communications device equipped with an embodiment of the invention can make adjustments to TCP sequence information, acknowledgment information, error correction information (e.g., checksum information) and packet length information within the packet in order to appropriately adjust the TCP connection information associated with that packet so as to not disrupt or disturb the TCP communication session state maintained by the receiving computer system. The recipient computer system can thus acceptably receive the modified packet without error and without disruption to the TCP connection state associated with the communications session over which that packet arrived. The recipient computer system might perhaps contain an application that utilizes the geographic information encoded within the packet (as introduced by a data communications device equipped with an embodiment of the invention that operates along the transmission path of the packet from the sending computer system to the receiving computer system) in order to provide or produce a customized response to a request for data (e.g., an HTTP request) that accompanies the geographical information within the original packet payload or data.

When the receiving computer system prepares a response in a packet to be returned to the original sending computer system using the TCP communications session, that receiving computer system can transmit the return packet back towards the original sending device over the computer network using the TCP session. The data communications device equipped with the embodiment of the invention can likewise intercept this return packet and can appropriately modify sequence information, acknowledgment information, error correction information and packet length information contained within this packet in order to account for the original introduction of the extra data into the first packet originally sent by the sending computer system. In other words, the data communications device can reverse and/or mask the effects of the introduction of the extra data into the first packet such that the TCP connection state maintained by the original sending computer system will not be disrupted. Once such adjustments are complete, the data communications device can forward the return packet back to the original sending computer system which receives the modified return packet without error and without disruption to the TCP connection state maintained by that computer system.

In addition, a data communications device configured with an embodiment of the invention can perform the same process for packets traveling in the other direction, such that packets exchanged between the seconding and receiving computer system in either direction, from sender to receiver or from receiver to sender can have data inserted into them and can have appropriate acknowledgement and sequence information adjusted in either these or in subsequently transported packets in order for each device (sending and recipient) to be able to properly maintain the communications session state in the presence of the extra data inserted in the packets traveling in both directions.

In particular, embodiments of the invention provide methods and apparatus for inserting data into packets associated with a communications session between a first and second computerized devices. The communications session may be, for example, a TCP communications session. Such computerized devices may be, for example, the sending and receiving computer systems mentioned in the example above or may be any type of computer system or electronic device that is capable of exchanging data in a networked computing environment.

One such method embodiment comprises the steps of receiving a first packet containing data being propagated from the first computerized device to the second computerized device in the communications session. The method inserts a first amount of extra data into the first packet to alter the size of the first packet and forwards the first packet including the first amount of extra data to the second computerized device. In this manner, a packet traveling from the first computerized device to the second computerized device can include extra data which alters the size of the packet and which is forwarded for successful receipt by the second computerized device without disrupting the communications session.

Another embodiment of the invention includes the operation of the aforementioned embodiment and further comprises the steps of receiving a second packet being propagated from the second computerized device to the first computerized device in the communications session. The second packet may be, for example, intercepted by a data communications device configured according to this embodiment. The second packet includes acknowledgment information for the first packet acknowledging receipt of the first packet by the second computerized device. This embodiment also includes a step of adjusting the acknowledgment information in the second packet based upon the first amount of extra data inserted into the first packet and forwarding the second packet including the adjusted acknowledgment information to the first computerized device such that the first computerized device receives the adjusted acknowledgement information that properly corresponds with a first connection state maintained by the first computerized device for the communications session between the first and second computerized devices. In this manner, by adjusting acknowledgment information, this embodiment of the invention allows the first computerized device that transmitted the first packet to receive a second packet containing a proper acknowledgement of the first packet according to connection state information maintained (and expected) by the first computerized device regardless of the fact that the first packet contained extra data inserted during propagation of the first packet from the first computerized device to the second computerized device.

Prior to introducing other embodiments of the invention, it is to be understood that the terms "first packet" and "second packet" are not intended to literally identify the first packet transmitted in a TCP communications session, but rather represent packets sent relative to each other at any time during the existence of the communications session. Based on this understanding, the first packet may be any packet transmitted between two computer systems in a TCP communications session and the second packet it is a packet sent in response to the first packet which contains an acknowledgment of the first packet. Subsequent packets are those transmitted after the first and second packet.

In another embodiment of the invention, the step of adjusting the acknowledgement information comprises the step of subtracting from the acknowledgement information a value equal to the first amount of extra data added to the first packet. In this manner, the acknowledgment information sent back to the first computerized device within the second packet is properly adjusted to remove the appearance or the introduction of the extra data that is present in the acknowledgment information initially created within the second packet that is sent from the second computerized device back to the first computerized device (i.e., prior to adjustment).

In a further embodiment of the invention, the initial embodiment includes the steps of adjusting sequence information in a subsequent packet being propagated, after the first packet, from the first computerized device to the second computerized device to account for the extra data added into the first packet. In doing so, this embodiment of the invention properly alters, modifies or adjusts the sequence information to account for the extra data added into the first packet such that a subsequent packet traveling from the first computerized device (which may have no knowledge of the extra data added to the first packet) to the second computerized device is properly sequence adjusted so as to not confuse the second computerized device which received the original first packet that the contained the extra data. In addition, this embodiment also includes a step of forwarding the subsequent packet including the adjusted sequence information to the second computerized device such that the second computerized device receives the adjusted sequence information that properly corresponds with a second connection state maintained by the second computerized device for the communications session between the first and second computerized devices.

In yet another embodiment of the invention, the step of adjusting sequence information in a subsequent packet comprises the step of adding to the sequence information a value equal to the first amount of extra data added to the first packet such that the step of forwarding the subsequent packet causes the second computerized device to receive the adjusted sequence information. That is, in this embodiment, the sequence information in a subsequent packet is incremented by the amount of extra data that was added to the first packet so as to properly correspond to expected sequence information that the second computer system expects to receive.

Another embodiment of the invention includes a step of continuing to exchange subsequent packets between the first and second computerized devices, and for each subsequent packet exchanged, adjusting connection state information including sequence and acknowledgement information to account for extra data added into packets exchanged between the first and second computerized devices such that the first and second computerized devices are able to maintain proper respective first and second connection states. In this manner, a device such as a data communications device is able to continually modify information such as TCP header information including sequence numbers and acknowledgment numbers and error correction (e.g., checksum) and packet length information in order to allow the first and second computer systems to maintain the TCP communications session without disruption from the introduction of extra data into one or more packets that are transported between those two computer systems. Such adjustments take place for the remainder of the duration of the communications session, even in situations where the extra data is inserted only during an early time period of the session. It is to be understood that extra data can be added to different packets traveling in both directions between the first and second computer systems at any time during the life of the TCP communications session according to embodiment of the invention. The operation of embodiments of the invention is able to account for all extra data added into all packets and is able to adjust such connection information within those packets so as to not disrupt the communication session for the first and second computer systems which exchange those packets.

Another embodiment of the invention includes maintaining connection state data in the data communications device that tracks an amount of extra data inserted into packets exchanged between the first and second computerized devices. Such a data communications device may be a switch, router, hub, gateway, bridge, firewall, or other device that exists anywhere along, in or that has access to the communications path over which packets associated with the communications session travel between the first and second computerized devices. The connection state data may be maintained in a table, database, linked list or other suitable data structure. This embodiment further includes the step of modifying connection information within packets passing through the data communications device that are exchanged between the first and second computerized devices to allow the first and second computerized devices to maintain proper respective first and second connection states regardless of the amount of extra data added in the packets.

In a further embodiment, the step of modifying connection information includes at least one of the steps or operations of adjusting sequence information within the packets exchanged between the first and second computerized devices, adjusting acknowledgement information within the packets exchanged between the first and second computerized devices, adjusting error correction information within the packets exchanged between the first and second computerized devices and/or adjusting packet length information within the packets exchanged between the first and second computerized devices. In this manner, embodiments of the invention are able to modify information within packets associated with the communications session so as to avoid disruption of communications session state maintained by the first and second computerized devices.

Yet another embodiment of the invention comprises the steps of receiving a second packet being propagated from the second computerized device to the first computerized device in the communications session. The second packet includes acknowledgment information for the first packet acknowledging receipt of the first packet by the second computerized device. The method adjusts the acknowledgment information in the second packet based upon the first amount of extra data inserted into the first packet and further inserts a second amount of extra data into the second packet to alter the size of the second packet. In other words, this embodiment allows extra data to also be inserted into a packet associated with communications session that is traveling from the second computerized device to the first computerized device (i.e., in the other direction as the first packet). In addition, this method forwards the second packet including the adjusted acknowledgment information and the second amount of extra data to the first computerized device such that the first computerized device receives the adjusted acknowledgement information that properly corresponds with a first connection state maintained by the first computerized device for the communications session between the first and second computerized devices and further receives the second amount of extra data.

Such embodiments of the invention allow insertion of data into packets associated with the communication session such as a TCP session that travel in both directions between the first and second computerized device without disrupting communications session information maintained within each of these computerized devices. The step of maintaining connection state data in the data communications device that tracks an amount of extra data inserted into packets exchanged between the first and second computerized devices tracks the second amount of extra data inserted into the second packet as well. In addition, the step of modifying connection information within packets passing through the data communications device that are exchanged between the first and second computerized devices modifies connection information within packets exchanged between the first and second computerized devices subsequent to the first and second packets such that the first and second amount of extra data does not adversely effect respective first and second connection states maintained in the first and second computerized devices. In other words, if the data insertion technique of this invention is used for packets traveling in both directions between the first and second computerized device, embodiments of the invention are capable of tracking such additional amounts of extra data inserted in both directions and are capable of modifying connection information within subsequent packets associated with the communications session such that no disruption to the communication session results from the insertion or introduction of the extra data in packets traveling in either direction from the appearance of the end devices.

In another embodiment of the invention, the first packet contains a hypertext transport protocol packet requesting data from a hypertext transport protocol server accessible by the second computerized device. In another embodiment, the data inserted is geographical information provided a geographical location related to the computerized device sending the packet.

Other embodiments of the invention include a computer system, such as a data communications device, computerized device, or any other device configured with software and/or circuitry to process and perform all of the method operations noted above and disclosed herein as embodiments of the invention. In such embodiments, the device, such as a data communications device (e.g., switch, router, dedicated data communications device, hub, or data insertion device specifically designed to perform operations associated with embodiments of the invention), comprises one or more communications interfaces (e.g., physical or wireless network interfaces), a memory (e.g., any type of computer readable medium, storage or memory system), a processor and an interconnection mechanism connecting the communications interface(s), the processor and the memory. In such embodiments, the memory system is encoded with a insertion manager application that when performed on the processor, produces a insertion manager process that causes the computer system to perform any and/or all of the method embodiments, steps and/or operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application and/or process(es), such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software and/or firmware or other such configurations can be installed or loaded onto a computer system, data communications device or other device and when such embodiments are executed, run, interpreted or otherwise perform, they cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, application, as software and hardware, or as hardware and/or circuitry alone. The features of the invention, as explained herein, may be employed in data communications devices and other computerized devices and software systems such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
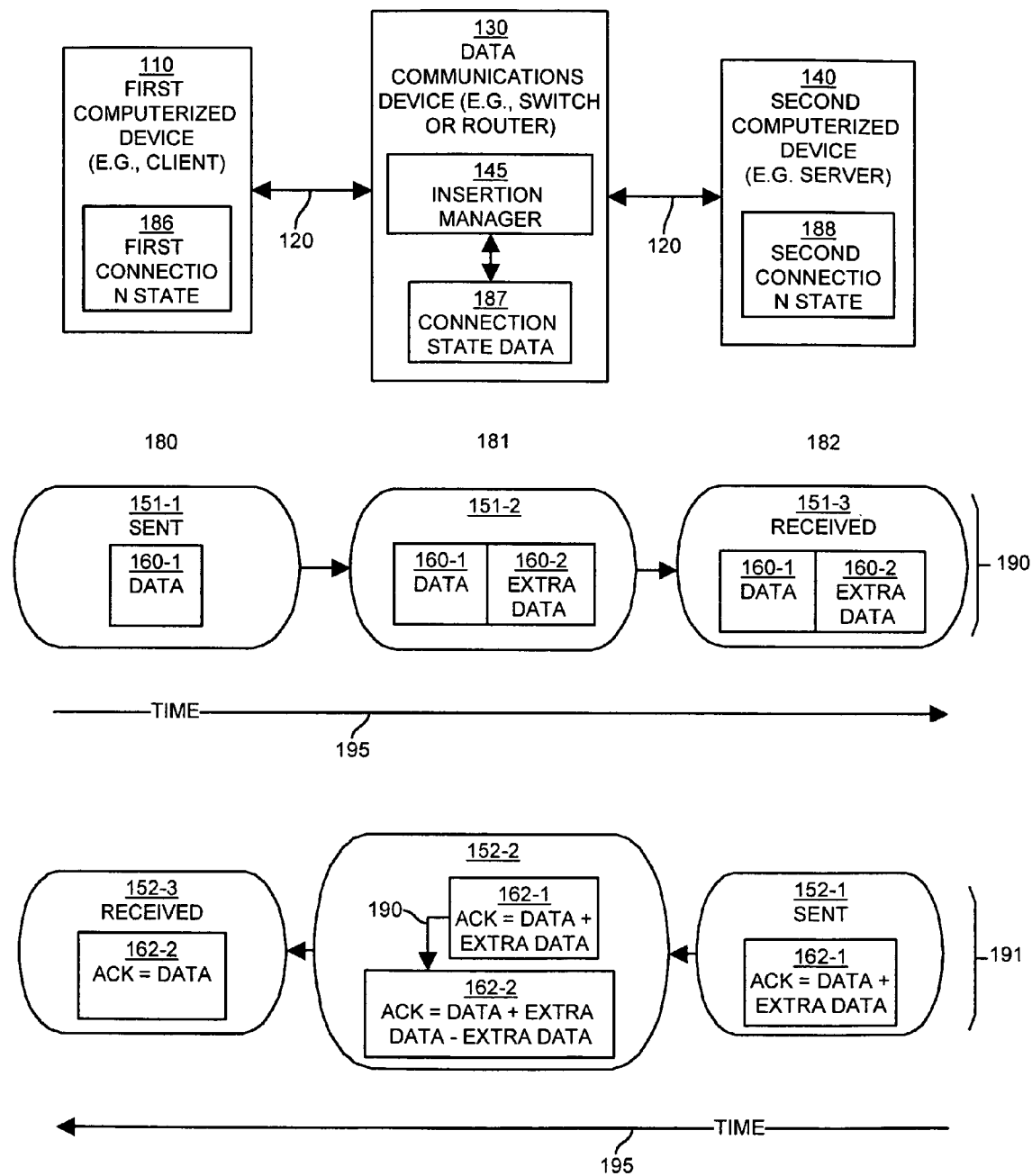
FIG. 1 illustrates an example exchange of packets in a communications session between a first and second computerized device in which an insertion manager configured according to embodiments of the invention inserts extra data.

Embodiments of the invention provide an insertion manager (e.g., process and application) that operates within a data communications device such as a switch or router or other device in a computer or data communications network. The insertion manager, which may be embodied as software, hardware, or a combination thereof, is able to receive or otherwise intercept a packet associated with a communications session such as a TCP session existing between two computerized devices (e.g., between a client and server). Upon receiving such a packet (e.g., a first packet) transmitted from a first computerized device (i.e., a sending computer system) in the session, the insertion manager is able to insert a first amount of extra data into the first packet thus altering the size of the first packet. The insertion manager can then cause the first packet including the first amount of extra data to be forwarded to the second (e.g. receiving or recipient) computerized device involved in communications session.

After processing the first packet including the extra data, the second or recipient computerized device can transmit a second packet back towards the original sending or first computerized device. The insertion manager can further operate to receive this second packet. The second packet can contain acknowledgement for the first packet acknowledging receipt of the first packet by the second computerized device and therefore acknowledging receipt of the extra data inserted by the insertion manager upon transfer of the first packet to the second computerized device. Since the unadjusted acknowledgement acknowledges receipt of extra data which is unbeknownst to the first computerized device, the insertion manager can adjust the acknowledgment information in the second packet (e.g., can subtract an amount) based upon the first amount of extra data inserted into the first packet which the insertion manager can maintain or otherwise track. The insertion manager can forward the second packet including the adjusted acknowledgment information back to the first computerized device such that the first computerized device receives the second packet error-free and without disruption to a communications session state maintained by that device. In other words, the insertion manager is capable of inserting data into a packet on route to the second device and adjusting acknowledgment of this data in a second return packet to remove the effect of the insertion of the extra data.

In addition, an insertion manager configured according to embodiments of the invention is further capable of adjusting sequence information in a subsequent packet sent from the first device to the second device. Recall that sequence information provides an indication of mow many bytes of data have been transferred from the first device during the life of the communications session. Since the insertion manager inserted extra data into the first packet while on route to the second device, any subsequent packets sent from the first device to the second device must have their sequence information modified to account for the insertion of the total amount of extra data inserted into all packets transferred up to this point in time. Accordingly, embodiments of the invention are able to insert data into multiple packets during the lifetime of a communications session. Acknowledgment and sequence information can be correspondingly adjusted in return receipt packets and in other packets sent so that TCP or other connection managers within the first and second devices are completely unaware of the insertion of the extra data into these packets. In a typical implementation, a device such as the second device can operate an application that utilizes the extra data inserted into packets traveling from the first device to the second device for various purposes.

As an example, suppose a client such as a web browser operating on the first computerized device requests a web page from the second computerized device by sending an HTTP GET request. Using the insertion manager configured according to embodiments of the invention, the insertion manager can insert extra data that might include geographical information providing an approximate location such as a zip code associated with the first computerized device. Perhaps the insertion manager operating according to this embodiment of the invention exists within an edge router to which the first computerized device is directly attached. As such, the zip code or other location information inserted into the packet traveling from the first computerized device to the second computerized device can identify an area from which the request for the web page originates.

Upon receipt of the packet containing the extra data, the second computerized device can utilize the geographical information in order to produce a customized web page result which is returned back to the first computerized device in the second and possibly in other subsequent packets since it can associate that communications session with the geographical location. The customized web page might contain, for example, local advertisements which are specifically relevant to the geographical locale associated with the geographic location identifier of the extra data inserted into the modified packet (i.e., modified by the insertion manager). In this manner, even though a conventional web browser contains no operational technique of identifying its physical or geographical location to a remote web server operating as the second computerized device, an insertion manager operating locally nearby to the computerized device that operates the web browser can insert the geographical information into web page requests (e.g., HTTP GET requests) such that those requests contain an identification of the location of the requesting user and so that responses to those requests can be customized.

FIG. 1 illustrates a simple example of a computer system environment 100 which is suitable for use in explaining an example operation of one embodiment of the invention. In addition, FIG. 1 illustrates the sequence or flow and sample contents of packets as operation of the invention transpires during communications to take place between two computerized devices.

The computer system environment 100 in FIG. 1 includes a first computerized device 110 that maintains a first connection state 186 which is coupled to a data communications device 130 such as a switch or a router or other such device.

The data communications device 130 is also in communications with a second computerized device 140 which maintains a second connection state 188. In this example, a communications session 120 such as a TCP session is taking place between the first and second computerized devices 110, 140 and passes through the data communications device 130. Operating within the data communications device 130 is in insertion manager 145 configured according to embodiments of the invention.

The insertion manager 145 maintains and has access to connection state data 187 which will be explained in more detail shortly. It is to be understood that the communications session 120 between the first computerized device 110 and the data communications device 130 and between the second computerized device 140 and the data communications device 130 can take place over any type of communications network such as a computer network like the Internet and represents physical or wireless data transmission links. In other words, there may be any amount of other data communications equipment that exists between the data communications device 130 and the first and second computerized devices 110 and 140. Assume for this example that the first computerized device 110 is a client computer system and the second computerized device is a server computer system. The client 110 is capable, for example, of requesting a web page or other content that the server 140 can serve back to the client 110.

Below the first and second computerized devices and the data communications device 110, 140, 130 are packets of data 151, 152 along with an illustration of simplified details of their contents. The contents of these packets 151 and 152 has been simplified in this example for ease of description of the invention. In particular, below location 180 in FIG. 1 are packets 151-1 and 152-3 as they exist within the first computerized device 110. Below location 181 in FIG. 1 are packets 151-2 and 152-2 as they exist within the data communications device 130. Likewise, below location 182 are packets 151-3 and 152-1 as they exist within the second computerized device 140.

The upper row of packets 151-1, 151-2 and 151-3 as designated at location 190 represents the transformation of a single packet (i.e., a first packet 151 or 190) as it is sent from left to right from the first computerized device 110 through the data communications device 130 and is received by the second computerized device 140 according to embodiments of the invention. In other words, the arrows between the packet representations represent the transfer of this packet through the network and its modification according to embodiments of the invention by the insertion manager 140. This indication is further exemplified by the time arrow 198 traveling from left to right below the upper row of packets 190. Likewise, the lower row of packets 152-1, 152-2 and 152-3 represent a single packet (i.e., a second packet) as it is sent from the second computerized device 140 through the data communications device 130 and is received by the first computerized device 110. To further assist in this understanding, the outermost representations of the first and second packets 190 and 191 are labeled with SENT and RECEIVED labels to indicate that the computerized devices above these packets either send or receive these respective packet representations.

An explanation of operation of the insertion manager 140 in relation to the first and second packets of data 190 and 191 will now be explained with respect to the processing steps performed by the insertion manager 140 as illustrated in the flow chart in FIG. 2.

Figure 2:
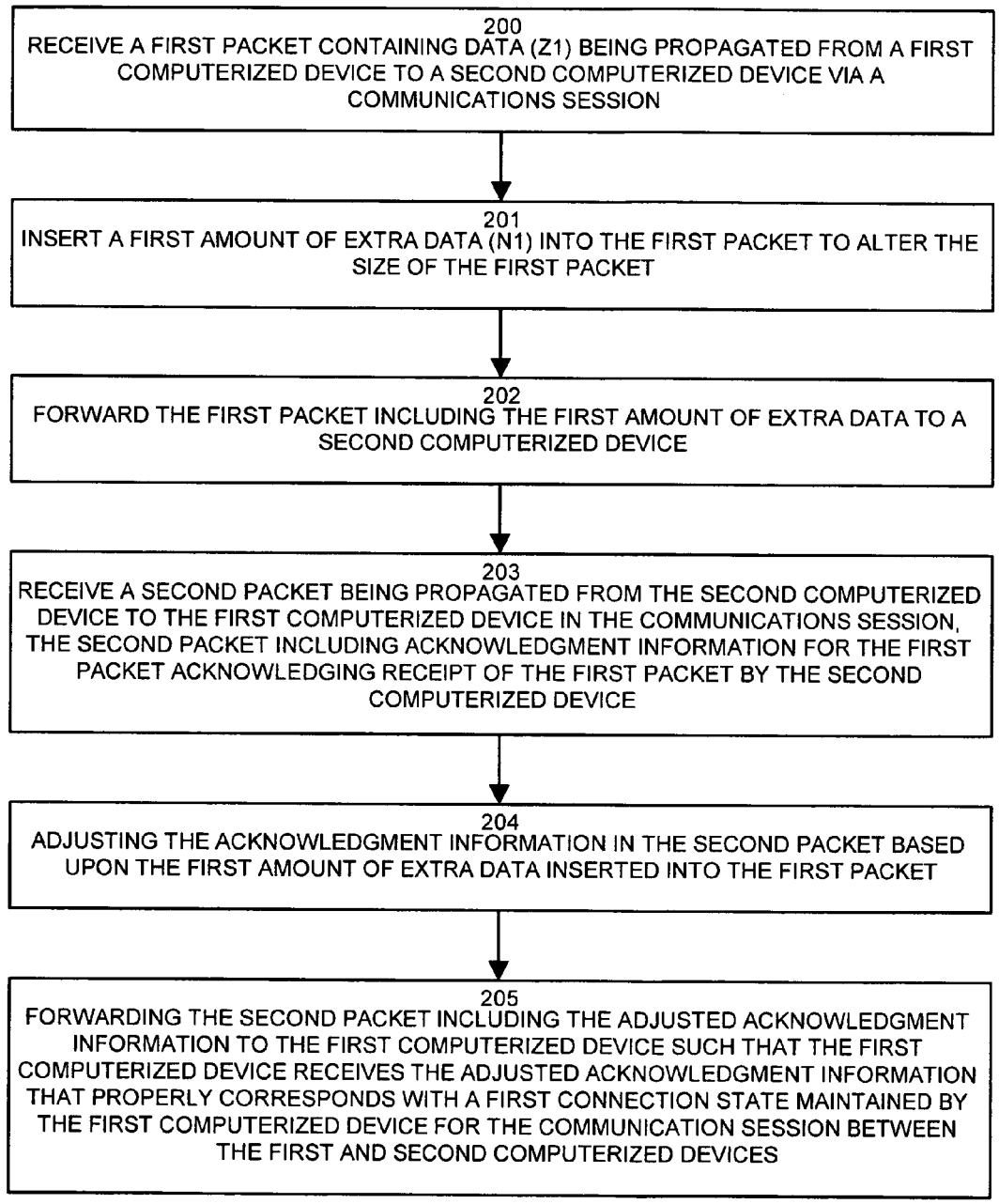
FIG. 2 is a flow chart of processing steps performed by a data communications device equipped with an insertion manager configured according to one embodiment of the invention.

FIG. 2 is a flow chart of processing steps as performed by an insertion manager 140 configured according to one example embodiment of the invention.

In step 200, the insertion manager 140 operating within the data communications device 130 receives a first packet 151-1 containing data 160-1 being propagated from a first computerized device 110 to a second computerized device 140 via a communications session 120.

In step 201, the insertion manager inserts a first amount of extra data 160-2 into the first packet 151-2 to alter the size of the first packet.

In step 202, the insertion manager 140 causes the data communications device 130 to forward the first packet 151-2 including the first amount of extra data 160-2 the second computerized device 140. As illustrated in FIG. 1, the second computerized device 140 receives the first packet 151-3 which includes the extra data 160-2. In this example, the original data 160-1 might be, perhaps, an HTTP GET request for a web page to be served by the server second computerized device 140. Also in this example, the extra data 160-2 that the insertion manager 140 inserted into the first packet might be, perhaps, geographical information providing an approximate geographical location of the first computerized device 110 that originated the web page request. As a result, the new data including the extra data might contain an HTTP GET request along with a parameter indicating a geographical location from which the request originated.

Once the second computerized device 140 processes the web page request, which may include utilizing the geographical information provided within the extra data 160-2 to produce a customized web page response, the second computerized device 140 produces a second packet 152-1 that can include all or a portion of the web page response (not specifically shown in this example) and that also includes an acknowledgment 162-1 acknowledging the total amount of data formerly received in the first packet 151-3. That is, the acknowledgment 162-1 includes a sum of the total number of bytes of the first packet 151-3 including the original portion of data 160-1 in addition to the amount of extra data 160-2 inserted by the insertion manager 140. This calculation of the acknowledgment 162-1 is illustrated in FIG. 1 by the formula ACK=DATA+EXTRA DATA. After producing the second packet 1 52-1, the second computerized device 140 transfers this second packet 152-1 over the communications session 120 back towards the first computerized device 110 for receipt by that device.

In step 203, the insertion manager 140 receives (e.g., intercepts) the second packet 152-1 being propagated back from the second computerized device 140 to the first computerized device 110 in the communications session 120. As stated above, the second packet 152-1 includes acknowledgment information 162-1 for the first packet 151-3 that acknowledges receipt of all data contained in the first packet 151-3 as received by the second computerized device 140.

Next, in step 204, the insertion manager 140 adjusts the acknowledgment information in the second packet 152-2 based upon the first amount of extra data 160-2 inserted into the first packet 151-2. In particular, in this embodiment of the invention, the insertion manager 145 subtracts from the acknowledgment information 162-2 a value equal to the first amount of extra data 160-2 added to the first packet 151-2. In other words, in step 204 the insertion manager 145 subtracts a value equal to the number of bytes of extra data previously inserted into the first packet 190 as that packet traveled from the first computerized device 110 to the second computerized device 140 through the data communications device 130. In doing so, the newly adjusted acknowledgment 162-2 properly reflects an acknowledgment value that is to be expected by the first computerized device 110.

In step 205, the insertion manager 145 causes the data communications device 130 to forward the second packet 152-2 including the adjusted acknowledgment information 162-2 to the first computerized device 110 such that the first computerized device 110 receives the adjusted acknowledgment information 162-2 that properly corresponds with a first connection state 192 maintained by the first computerized device 110 for the communications session 120 between a first and second computerized devices 110, 140.

According to the aforementioned processing steps then, the insertion manager is able to insert extra data 160-2 into a packet and then is able to detect a return response to that packet that contains an acknowledgment 162-1 of the amount of data in the first packet including the extra data. In doing so, the insertion manager 145 can then adjust the acknowledgment information in order to modify (i.e., to remove) that acknowledgment's reflection of the receipt of the extra data 160-2 by the second computerized device 140 thus producing an adjusted acknowledgment 162-2 that the first computerized device 110 will properly handle without disruption to the first connection state 192.

It is to be understood that other processing may take place as well in modification of the first and/or second packet by the insertion manager 145 such as modification of checksum information and packet length information, which will be discussed in more details later.

Figure 3:
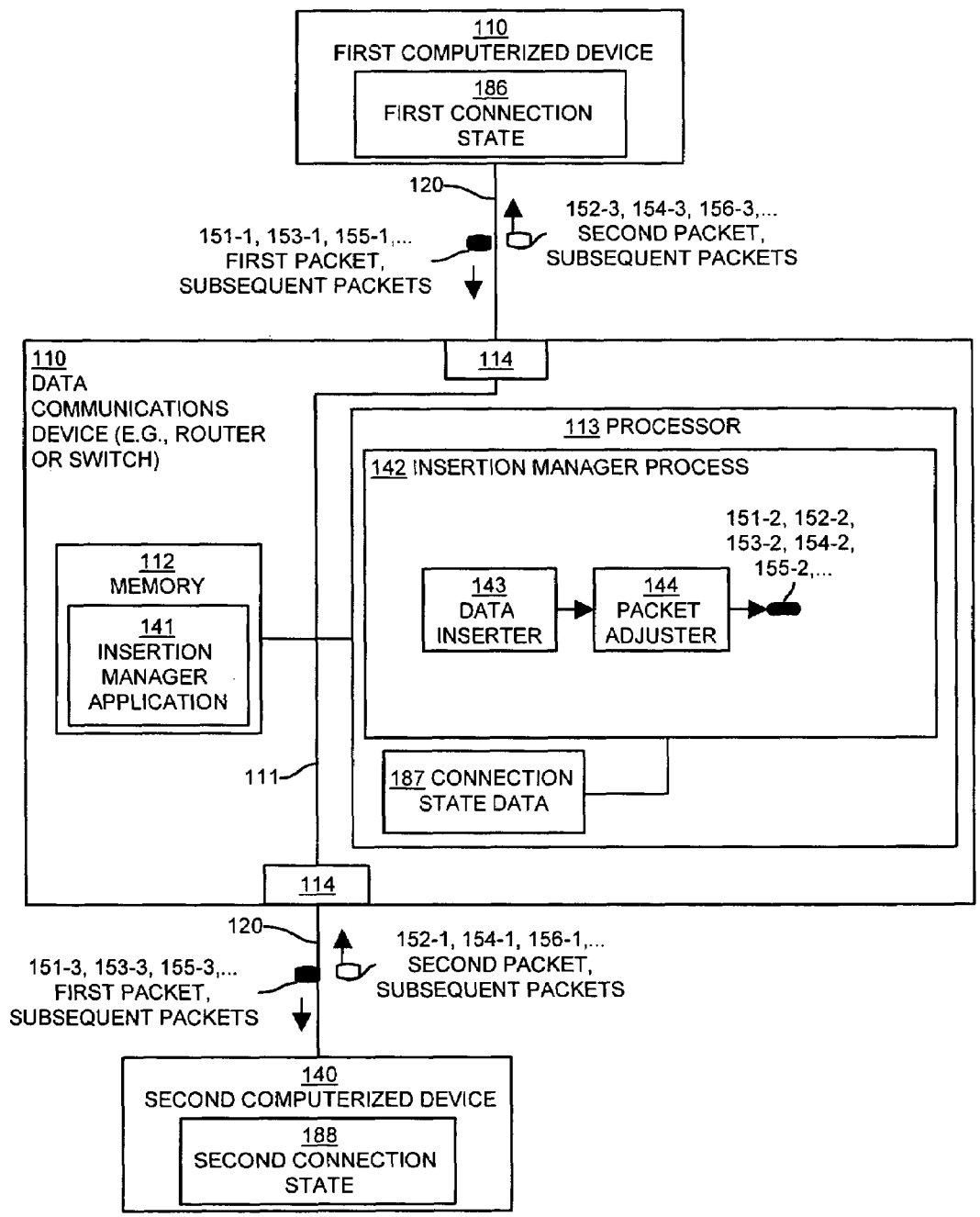
FIG. 3 illustrates an example architecture and data flow of operation of an insertion manager within a data communications device configured according to one example embodiment of the invention.

FIG. 3 illustrates a more detailed architecture of a data communications device 110 configured according to one embodiment of the invention. FIG. 3 also illustrates a data flow diagram showing how packets can be processed by an insertion manager process 142.

The data communications device 110 in this example embodiment of the invention includes an interconnection mechanism 111 such as a data bus or circuitry which interconnects a memory 112, a processor 113 and one or more communications interfaces 114. The memory 112 may be any type of volatile or non-volatile memory or storage system such as computer memory (e.g., random access memory (RAM), read-only memory (ROM), or another type of memory), disk memory (e.g., hard disk, floppy disk, optical storage and so forth). The memory 112 is encoded with logic instructions and/or data that form an insertion manager application 141 configured according to embodiments of the invention. In other words, the insertion manager application 141 represents software code, instructions and/or data that reside within memory or storage 112 or within any computer readable medium accessible to the data communications device 110. The processor 113 represents any type of circuitry or processing device such as a central processing unit or application-specific integrated circuit (ASIC) that can access the insertion manager application 141 encoded within the memory 112 over the interconnection mechanism 111 in order to execute, run, interpret, operate or otherwise perform the insertion manager application 151 logic instructions. Doing so forms an insertion manager process 142. In other words, the insertion manager process 142 (represented in FIG. 1 generally as the insertion manager 145) represents one or more portions of the logic instructions of the insertion manager application 151 while being executed or otherwise performed on, by or in the processor 113 within the data communications device 110.

The insertion manager process 142 includes a data inserter 143 and a packet adjuster 144. Generally, the data inserter 143 is activated upon detection of a packet in which extra data (e.g., 160-2 from FIG. 1) is to be inserted. The packet adjuster 144 operates to manipulate or otherwise adjust sequence and/or acknowledgment information as well as air correction and packet length information within HTTP header of a packet being exchanged between the first and second computerized devices 110 and 140. The insertion manager process 142 maintained and has access to connection state data 187 which generally contains, in a database, file, table, linked list or other suitable data structure entries which track packet modifications (e.g., bytes of data inserted into particular packet) and sequence and acknowledgment information for packet being transferred between the first and second computerized devices 110 over the connection session 120. In particular, the connection state data 187 and one embodiment of the invention can contain a finite number of entries, one per packet exchange over the communications session 120. Each entry represents a packet to which data has been modified such as a packet in which data has been added or inserted as previously explained.

In particular, the connection state data 187 can contain, for each entry, an original received sequence number and a corresponding acknowledgment number that a recipient computer system of that packet (e.g., one of the first or second computerized devices) is expecting for acknowledgment of reception of the packet corresponding to that entry (such an acknowledgement forthcoming in a subsequent packet). The entry for a particular packet within the connection state data 187 can also contain, in one embodiment of the invention, a new sequence number expected by the computerized device which is to receive the modified packet. This new sequence number is the original sequence number of the entry for this packet in combination with (i.e., in addition to) the total number of bytes of data inserted or added to all packets in the TCP session since the initial establishment of the commutation session 120 (e.g., since the reception of the TCP synchronize packet). In addition, the connection state data 187 can contain an entry indicating how many bytes of data had be inserted into this particular packet. Other information may be contained in the entry for a packet as well.

An example of the connection state data 187 for use by insertion manager process as configured according to one embodiment of the invention is as shown in the following table:

CONNECTION STATE DATA TABLE 187

| PACKET | ORIG. SEQ. | CORRES. ACK. | NEW SEQ. | BYTES ADDED |
|--------|------------|--------------|----------|-------------|
| 1      | 10         | 10           | 15       | 5           |
| 2      | 20         | 20           | 27       | 7           |
| ...    |            |              |          |             |
| ...    |            |              |          |             |

As shown in the example connection state data table 187 above, successive packets sent from, for example, the first computerized device 110 to the second computerized device 140 are successively labeled 1, 2, 3 and so forth in the first PACKET column. This column is provided for reference for this discussion. The ORIG. SEQ. column contains the original sequence number provided within a packet for that entry (i.e., for that row in the table) by the first computerized device 110 upon transmission of that packet towards the second computerized device 140. The corresponding acknowledgment column CORRES. ACK. indicates what acknowledgment value the first computerized device 110 will be expecting in a return packet that acknowledges receipt of the packets that corresponds to an entry within this table. The last column labeled BYTES ADDED identifies how many additional bytes of data the insertion manager process 142 inserts into the particular packet corresponding to that entry. In the example for packet number one (1), five (5) bytes of data have been added by the insertion manager into the packet as extra data (e.g., as extra data 160-2 as discussed above with respect to FIG. 1). Accordingly, the column labeled NEW SEQ. reflects a sequence number value that the second computerized device 140 will be expecting upon receipt of the modified packet corresponding to the row entry. In other words, the new sequence number represents the summation of the original sequence number and the number of bytes added to the packet.

Using the information in the connection state data table 187, the insertion manager process 142 is able to insert extra data 160-2 into packets traveling between the first computerized device 110 and the second computerized device 140 and is able to properly adjust sequence number and acknowledgment information associated with those packets in order to make the recipient computerized device receiving those packets (i.e., one of the first and second computerized devices 110 and 140) correctly and non-disruptively maintained respective connection state information even though the insertion manager process 142 is able to insert additional data into such packets.

Figure 4:
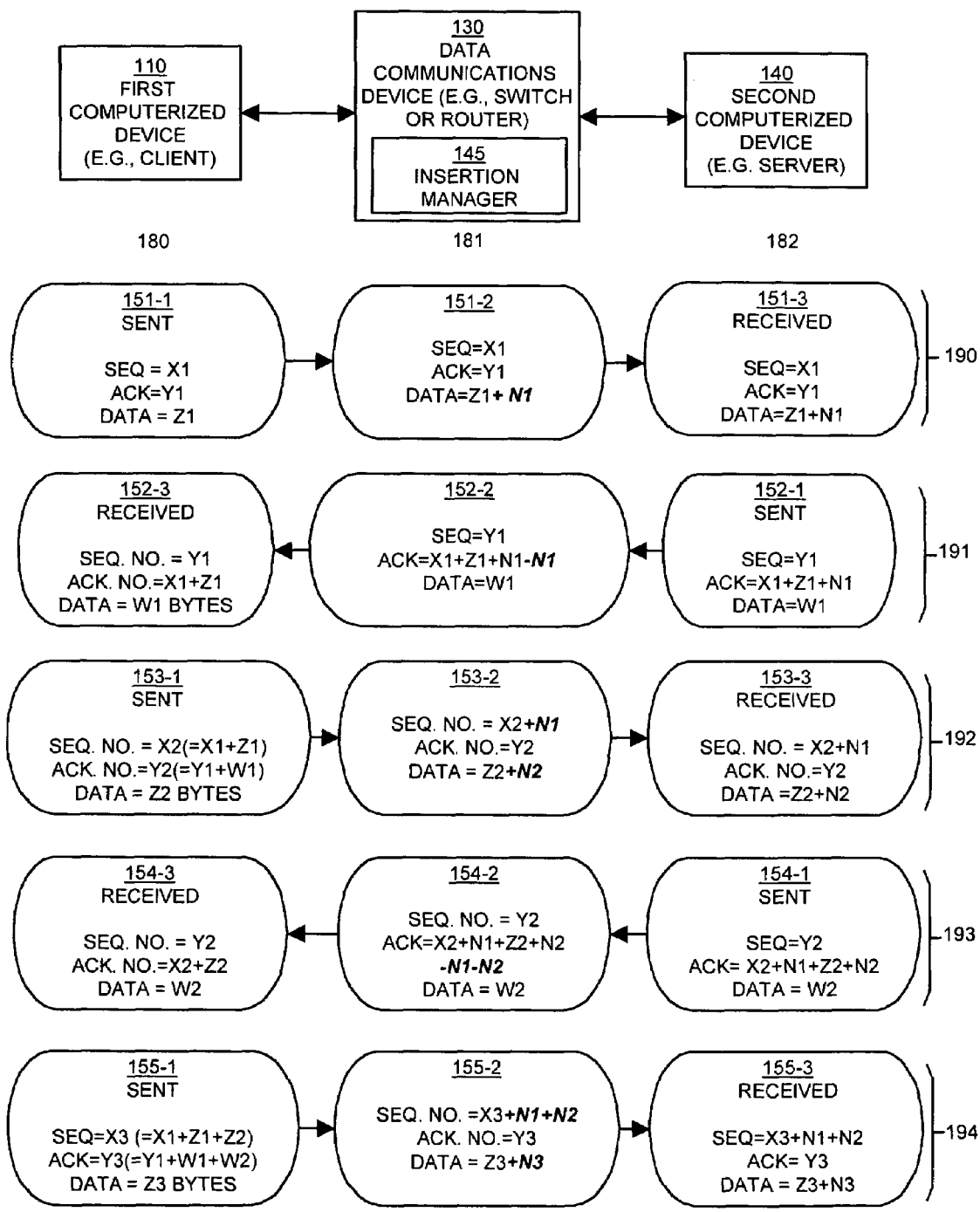
FIG. 4 illustrates a more detail example exchange of packets in a communication session produced as a result of operation of an insertion manager configured according to one embodiment of the invention.

FIG. 4 illustrates a more detailed exchange of packets between the first computerized device 110 and the second computerized device 140 in which the insertion manager 145 is capable of inserting extra data into multiple packets traveling from the first computerized device 110 to the second computerized device 140. Each packet illustrated in FIG. 4 shows the relevant sequence number information, acknowledgment information and original and extra data that exists as each packet 190 through 194 traverses between the computerized devices 110 and 140 through the data communications device 130 in a computer network such as the Internet.

In particular, the first two rows showing the details of the first and second packet 190 and 191 are created and processed in a manner as previously explained with respect to the example in FIG. 1. Accordingly, upon receipt of the packet 152-3 by the first computerized device 110, the insertion manager process 142 (FIG. 3) now maintains a connection state data table 187 containing two entries for the first two packets 190 and 191. One difference between this example and the former example in FIG. 1 is that in the second packet 191, the second computerized device 140 includes W1 bytes of data for transmission to the first computerized device 110. In other words, data is inserted in both directions in the example in FIG. 4.

As in the previous example, at the packet location 152-3, the insertion manager process 142 has successfully inserted extra data N1 (as shown in packet 151-2) for delivery to the second computerized device 140 within packet 151-3. Accordingly, in packet 152-1, the second computerized device 140 acknowledges receipt of all of the data, which includes the original data Z1 as well as the extra data N1. At packet location 152-2, the insertion manager process 142 adjusts the acknowledgment information to reduce the acknowledgment of the number of bytes received by the second computerized device by the amount of extra data N1 that the data insertion process 142 previously inserted into the first packet 151-2 (i.e., an amount of all data inserted in all former packets). Accordingly, returning again to location 152-3, the first computerized device 110 receives a correct acknowledgment indicating that X1+Z1 bytes are acknowledged as being received by the second computerized device 140 (as opposed to X1+Z1+N1 bytes that were actually received), where X1 happens to be the sequence number at which this example begins (i.e., as indicated in packet 151-1).

Beginning in the third row with a subsequent packet 192, the first computerized device 110 assumes that sequence number X2 is now the appropriate position indicating all bytes that the first computerized device 110 has transferred during this communications session thus far. Likewise, the acknowledgment in packet 153-1 indicates or acknowledges receipt of Y2 bytes of data from the second computerized device 140. The acknowledgment Y2 represents the first computerized devices acknowledgment of W1 bytes of data plus its former acknowledgment value Y1. In other words, the acknowledgment Y2 represents the value of data bytes that the first computerized device 110 is a counting as received from the second computerized device 140 since the beginning of the communications session.

Directing attention now to packet 153-2 in row 3, the insertion manager process 142 inserts a second portion of extra data N2 into the subsequent packet 192 traveling from the first computerized device 110 to the second computerized device 140. In addition, since this subsequent packet 153-2 follows after a former packet to which former additional extra data was previously added (i.e., first packet series 151), the sequence number of this packet 153-2 must be increased such that the second computerized device 140 will receive a proper sequence number accounting for all additional extra data inserted up to this point in the session, but not including the additional data of this particular packet 153-2. In other words, since one additional amount of extra data N1 was formerly added to the packet 151 (row 190) sent to the second computerized device 140, the next sequence number sent to the second computerized device 140 in another packet in this direction for this connection must account for this additional data. The insertion manager 145 thus increases this sequence number by a value equal to the total extra data inserted thus far. Accordingly, upon receipt of the packet 153-3, the second computerized device 140 is able to properly maintain its connection state information 188 without disrupting the TCP connection.

After processing the packet 153-3, the second computerized device 140 produces a response packet 154-1 in row 4 (subsequent packet 193). As this packet 154-1 travels back to the first computerized device 110, the data communications device 130 equipped with the insertion manager process 142 configured according to embodiments of the invention again intercepts this packet in order to properly adjust acknowledgment information to remove any indication of all data inserted into any packets DOS far that have travels from the first computerized device 110 to the second computerized device 140. Specifically, directing attention to packet 1 54-2, the acknowledgement is reduced by the number of bytes of data N1 and N2, which is a cumulative amount of data inserted into packets traveling towards the second computerized device 140 from the first computerized device 110. Accordingly, the acknowledgment in packet 154-3 is as to be expected by the first computerized device 110 and thus the first connection state 186 is not disrupted by the insertion of the data.

Thereafter, in row 5 of the example in FIG. 4 (subsequent packet 194), the first computerized device 110 again prepares a subsequent packet to send to the second computerized device 140. As the packet 155-1 travels through the data communications device 130, the insertion manager process 142 intercepts the packet 115-1 and operates the data inserter 143 (FIG. 4) in order to insert additional extra data N3 into the payload of this packet 155-2. In addition, due to the former two other amounts of extra data N1 and N2 that were previously inserted into the payload of former packets sent to the second computerized device 140, the insertion manager process 142 operates the packet adjustor 144 (FIG. 4) to properly adjust (i.e., increments) the sequence number X3 to account for these former data insertions N1 and N2. Accordingly, the packet 155-3 received by the second computerized device 140 contains the proper sequence number as well as the third portion of additional extra data N3, all without disrupting the second connection state 188 maintained by the second computerized device 140.

In this manner, the aforementioned processing operations may be repeated successively in order to be able to insert additional amounts of extra data into packets traveling from the first computerized device 110 to the second computerized device 140. It is to be understood that this same processing technique can be applied for packets traveling from the second computerized device 140 to the first computerized device 110 over the same communications session 120 (e.g., in the other direction over the same TCP session). In other words, as packets travel from right to left in FIG. 4 from the second computerized device 140 to the first computerized device 110, the data communications device 130 can operate the data insertion process 142 to insert additional amounts of data into these packets. In addition, the aforementioned techniques of adjusting sequence numbers and acknowledgment information within these packets, such adjustments can be done in a similar manner in order to properly present sequence and acknowledgment information to the first and second computerized devices 110 and 140 for data inserted for the packets going from the second 140 to the first 110 device.

Figure 5:
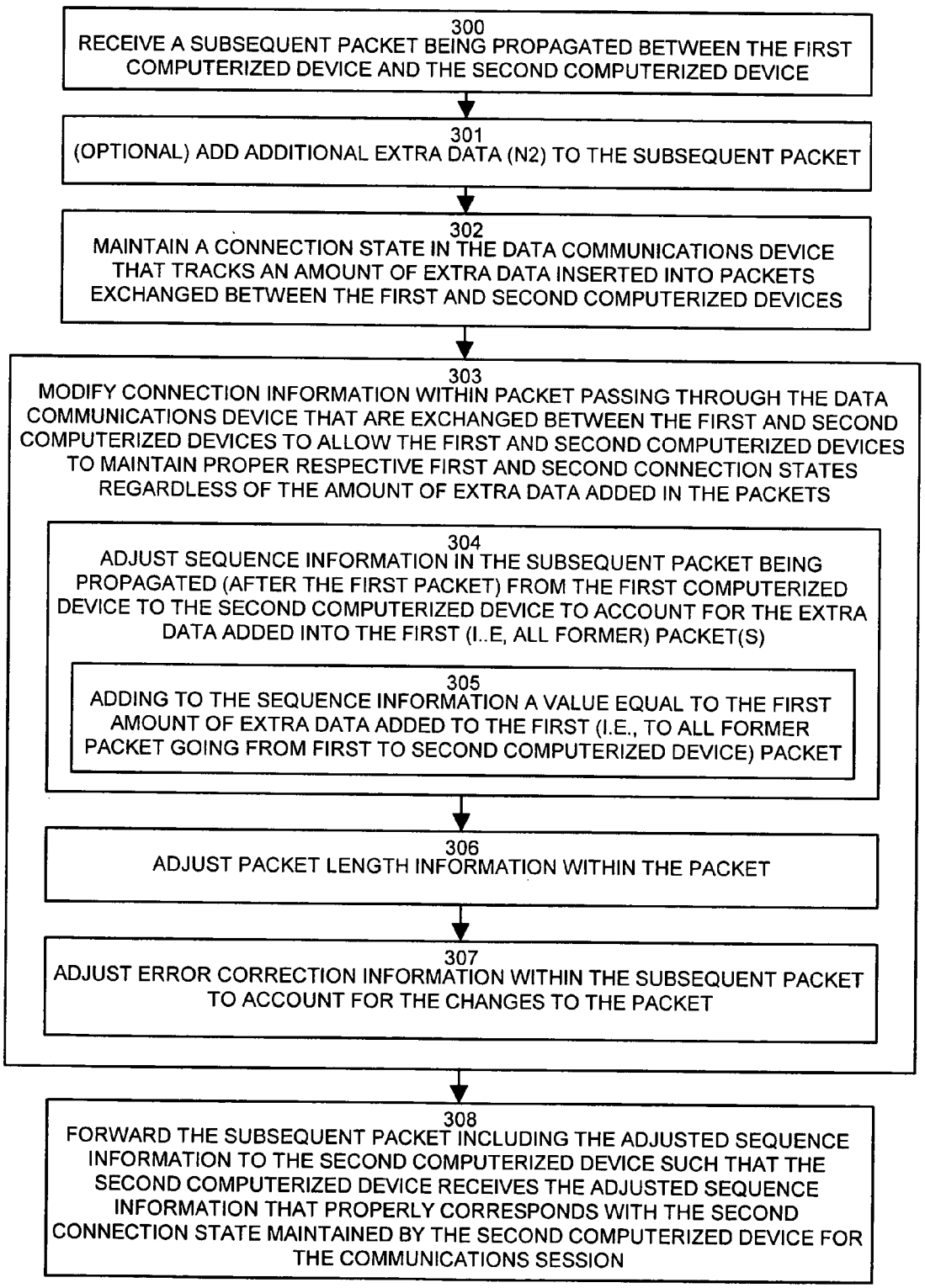
FIG. 5 is a flow chart showing the details of operation of a data communications device operating an insertion manager according to one example embodiment of the invention.

FIG. 5 illustrates a more detailed set of processing steps performed according to one embodiment of the invention to achieve the aforementioned operations as explained with respect to FIG. 4. In particular, the flow chart of processing steps illustrated in FIG. 5 allows extra data to be inserted into packets passing between the first and second computerized devices 110 and 140.

In step 300, the insertion manager process 142 receives a subsequent packet being propagated between the first computerized device 110 and the second computerized device 140. As an example, this step correspond to the packet 192 shown in row 3 of FIG. 4 as previously explained.

In step 301 which is an optional step, additional extra data is added to the subsequent packet.

Next, in step 302, the data insertion process maintains a connection state (e.g., maintains the table 187) within the data communications device 130 that tracks an amount of extra data inserted into packets exchanged between the first and second computerized devices 110 and 140 (i.e., in either direction). As previously explained, the connection state data table 187 can be used to maintain this information. In situations in which the insertion manager process 142 inserts data in packets traveling in both directions between the first and second computerized devices, two distinct tables (e.g., 187-1 and 187-2) can be maintained to track the amounts of data headed in each direction in order to properly update connection information for each computerized device.

In addition to creating a table entry to maintain the connection state in step 302, in step 303, the insertion manager process 142 modifies connection information within the subsequent packets passing through the data communications device 130 that are exchanged between the first and second computerized devices 110 and 140 in order to allow the first and second computerized devices to maintain proper respective first and second connection states 186 and 188 regardless of the amount of extra data (e.g., N1, N2, and so forth) added in the subsequent packets.

Specifically, in step 304, the insertion manager process 142 adjusts sequence information in the subsequent packet being propagated (i.e., after the first and second packets of previous examples) between the first and second computerized devices to account for the extra data added into all former packets traveling in this direction.

One particular embodiment as illustrated in step 305, the insertion manager process 142 adds, to the sequence information of the subsequent packet, a value equal to the amount of extra data added to all former packets traveling in direction of the subsequent packet. In this manner, the sequence number is appropriately increased to account for the additional data.

Next, in step 306, the insertion manager process adjusts packet length information within the packet to reflect any additional amounts of extra data added into the packet such that the packet length correctly represents the size of the packet.

Next, in step 307, the insertion manager process 142 adjusts error correction information within the subsequent packet to account for changes to the contents of the packet. In this manner, upon receipt of the packet by either the first or second computerized device, the error correction information will correctly compare with error correction information computed as the packet is received.

Once the connection information within the packet is properly modified, in step 308, the insertion manager process causes the data communications device 130 to forward the subsequent packet including the adjusted sequence information to the recipient computerized device such that the recipient computerized device receives the adjusted sequence information that properly corresponds with the connection state information maintained by that recipient computerized device for the communications session (i.e., connection state information maintained by one of the first or second computerized devices that received the recipient packet for which data was added).

Using the aforementioned techniques, a solution is provided to allow the insertion of data into packets traveling between computerized devices or computer systems over a communications session such as a TCP session.

As noted above, the optional step of adding extra data in step 301 indicates that not all packets are required to include extra data. It is to be understood that in one embodiment, if a TCP packet has no data added and it is necessary to create an entry within the connection state data table 187.

In addition, as previously explained with respect to FIG. 4, when the insertion manager process 142 receives a packet (i.e., intercepts), it can determine which entry in the connection state data table 187 applies to that packet by walking through the list of entries (i.e., rows) within the table 187 searching for a matching entry based on sequence and acknowledgment number information. In the event of receipt of a partial acknowledgment from one of the computerized devices, the data insertion manager process 142 can handle the situation by selecting an entry in the table which reflects connection state data for a packet previously transferred between the first and second computer systems thus forcing the computerized device that sent that packet to retransmit an entire frame of data related to the TCP session rather than portions of the frame of data.

In addition, if a packet received from a computerized device is matched up with an entry in the connection state data table 187 by the insertion manager process 142 and it turns out that packet information such as sequence number and acknowledgment information falls between two entries within the table 187 (for a received packet), the number of bytes inserted by the older one of the two entries between which the current received packet corresponds with can be used to subtract the acknowledgment number from that computerized device. In other words, if a packet is intercepted and its sequence number and acknowledgment information don't exactly match the specific table entry but fall between two table entries, then the acknowledgement information from a former table entry can be used which may cause the recipient to retransmit that packet again.

Those skilled in the art will understand that there can be many variations made to the embodiments explained above while still achieving the same objective of those embodiments and the invention in general. For example, embodiment of the invention are not limited to operations within networks that utilize TCP communications sessions. Rather, any type of communications protocol that uses sequencing and acknowledgments between computerized devices can benefit from embodiment of the invention as explained herein. In addition, the insertion manager process and insertion manager application previously explained need not reside within a data communications device to operating correctly within the past of packets between first and second computerized devices. Instead, in an alternative embodiment of the invention, the insertion manager 145 can operate in a separate device which receives information from a data applications device processing packets of the communications session. In other words, the insertion manager 145 may operate in a separate computing facility in order to perform according to the operations explained herein by remotely controlling a data communications device to forward adjusted packets accordingly. Such variations are intended to be covered by the scope of this invention. As such, the foregoing description of embodiments of the invention are not intended to be limiting. Rather, any limitations to the invention are presented in the following claims.

The invention claimed is:

1. A method for inserting data into packets associated with a communications session between a first computer device and a second computer device in a network, the method comprising:

receiving a first packet including original data being propagated from the first computer device to the second computer device for the communications session, the first packet received after being transmitted from the first computer device and traveling over a portion of the network to the second computer device;

inserting a first amount of extra data into the first packet to alter the size of the first packet;

forwarding the first packet including the first amount of extra data to the second computer device; and in response to receiving an acknowledgment message from the second computer device that the second computer device received the first packet including the original data as well as the first amount of extra data, adjusting sequence information stored in the acknowledgement message by subtracting a value equal to the first amount of extra data from the sequence information, transmitting a message to the first computer device indicating that the second computer device received the first packet, where the message comprises the modified acknowledgement message.

2. A method for inserting data into packets associated with a communications session over a network between a first computer and a second computer, the method comprising:

receiving a first packet transmitted over the network from the first computer to the second computer, the first packet being associated with the communications session;

inserting a first amount of extra data into the first packet to alter an original size of the first packet;

forwarding the first packet including the first amount of extra data over a second portion of the network to the second computer;

receiving a second packet being propagated from the second computer to the first computer in the communications session, the second packet including acknowledgment information acknowledging receipt of the first packet by the second computer;

adjusting the acknowledgment information in the second packet based upon the first amount of extra data inserted into the first packet, where the adjusting includes subtracting a value equal to the first amount of extra data from sequence information stored in the acknowledgement information; and forwarding the second packet including the adjusted acknowledgment information to the first computer such that the first computer receives the adjusted acknowledgment information, the adjusted acknowledgment information indicating that the second computer received the first packet without any of the first amount of extra data.

3. A method as in claim 2 further comprising:

after forwarding the first packet to the second computer, for each of at least one subsequent packet originated at the first computer and sent to the second computer:

i) intercepting a respective subsequent packet;

ii) inserting extra data into the respective subsequent packet;

iii) forwarding the respective subsequent packet to the second computer;

in response to forwarding the at least one subsequent packet to the second computer, receiving an acknowledgment message from the second computer indicating receipt of the at least one subsequent packet as well as respective extra data inserted into the at least one subsequent packet;

in lieu of forwarding the acknowledgment message from the second computer to the first computer indicating that the second computer properly received the at least one subsequent packet, modifying the acknowledgment message to appear as though the second computer only received the at least one subsequent packet and corresponding data payload originated by the first computer without acknowledging receipt of the respective extra data inserted into the at least one subsequent packet; and forwarding the modified acknowledgment message to the first computer.

4. A method as in claim 3 further comprising:

intercepting at least one message from the second computer to the first computer;

inserting extra data in the intercepted message from the second computer to the first computer; and modifying an acknowledgment message originated by the first computer and sent to the second computer such that, although the acknowledgment message originally indicates acknowledgment of receipt of the messages sent from the second computer to the first computer as well as the inserted extra data, a data communications device notifies the second computer that the first computer received the messages without the inserted extra data.

5. A method as in claim 3, wherein steps of receiving and forwarding the first packet and the second packet include supporting communications between the first computer and second computer according to TCP (Transmission Control Protocol), the data communication device being one of i) a switch, ii) a router, iii) a hub, iv) a bridge, v) a gateway of the network.

6. A method as in claim 3, wherein inserting the first amount of extra data into the first packet includes inserting information identifying an approximate location associated with the first computer in the network, the information identifying the approximate location information being used by the second computer to provide a custom response to the first packet sent by the first computer.

7. The method as in claim 6, wherein inserting information identifying the approximate location associated with the first computer in the network includes:
defining the approximate location with respect to a zip code associated with the first computer.

8. A computer program product having a computer-readable medium including computer program logic encoded thereon that, when performed on a processor in a computerized device having a coupling of a memory, a processor, and at least one communications interface provides a method for inserting data into packets associated with a communications session between a first computerized device and a second computerized devices by causing the computerized device to perform the operations of:
receiving a first packet including original data being propagated from the first computer device to the second computer device for the communications session;
inserting a first amount of extra data into the first packet to alter the size of the first packet;
forwarding the first packet including the first amount of extra data to the second computer device; and
in response to receiving an acknowledgment message from the second computer device that the second computer device received the first packet including the original data as well as the first amount of extra data, adjusting sequence information stored in the acknowledgement message by subtracting a value equal to the first amount of extra data from the sequence information stored in the acknowledgement message, transmitting a message to the first computer device indicating that the second computer device received the first packet, where the message comprises the modified acknowledgement message.

9. A data communication device disposed in a network at a remote location with respect to a first computer device and a second computer device, the data communication device including:
means for receiving a first packet including original data, the first packet being propagated from the first computer device over the network through the data communication device to the second computer device;
means for inserting a first amount of extra data into the first packet to alter the size of the first packet;
means for forwarding the first packet including the first amount of extra data to the second computer device; and
means for transmitting a message to the first computer device indicating that the second computer device received the first packet without providing any indication in the message that the data communication device inserted the first amount of extra data into the first packet received by the second computer device and that the second computer device received the first amount of extra data, wherein transmitting the message occurs in response to receiving an acknowledgment message from the second computer device that the second computer device received the first packet including the original data as well as the first amount of extra data,
means for adjusting sequence information stored in the acknowledgement message by subtracting a value equal to the first amount of extra data from the sequence information stored in the acknowledgement message.

10. A method comprising:
forwarding contents of a first packet received from a first computer device over a first network path to a second computer device over a second network path;
receiving a second packet from the first computer device over the first network path;
adjusting sequence information stored in the second packet to account for a first amount of extra data added into the first packet prior to being forwarded over the second network path to the second computer device, the first amount of extra data being added to the first packet from a source other than the first computer device, where the adjusting includes:
i. subtracting a value equal to the first amount of extra data from the acknowledgment information stored in the return packet;
ii. forwarding the return packet including modified acknowledgment information to the first computer device, the steps of subtracting and forwarding are performed to prevent the first computer device from learning that the first amount of extra data was added to the first packet prior to being forwarded to the second computer device;
forwarding the second packet including the adjusted sequence information over the second network path to the second computer device;
after forwarding the first packet to the second computer device, receiving a return packet over the second network path from the second computer device for transmission over the first network path to the first computer device, the return packet at least in part acknowledging receipt of the contents as well as the first amount of extra data; and
prior to forwarding the return packet to the first computer device, modifying acknowledgment information in the return packet.

11. A method as in claim 10, wherein adjusting sequence information stored in the second packet includes:
adding, to the sequence information received in the second packet from the first computer device, a numerical value equal to the first amount of the extra data added to the first packet such that the step of forwarding the second packet causes the second computer device to receive the adjusted sequence information.

12. A method as in claim 11 further comprising:
in addition to adjusting sequence information stored in the second packet propagated from the first computer device to the second computer device, modifying the second packet to include a second amount of extra data prior to forwarding the subsequent packet over the second network path to the second computer device.

13. A method as in claim 12 further comprising:
maintaining connection state information in a corresponding data communication device that adjusts the sequence information in the second packet, the corresponding data communication device tracking respective amounts of extra data inserted into respective data packets received from the first computer device over the first network path and forwarded over the second network path to the second computer device such that the first computer device is not aware that the corresponding data communication device adds extra data to the respective data packets.

14. A method as in claim 10 further comprising:
receiving a third packet from the first computer device over the first network path;
adjusting sequence information stored in the third packet to account for a second amount of extra data added into the second packet prior to being forwarded over the second network path to the second computer device, the second amount of extra data being added to the second packet from a source other than the first computer; and forwarding the third packet including the adjusted sequence information over the second network path to the second computer device.

15. A method as in claim 14, wherein adjusting sequence information stored in the third packet includes:
adding, to the sequence information received in the third packet from the first computer device, a numerical value equal to the first amount of the extra data added to the first packet plus the second amount of extra data added to the second packet.

16. A method as in claim 10 further comprising:
in addition to adjusting sequence information stored in the second packet propagated from the first computer device to the second computer device, modifying the second packet to include a second amount of extra data prior to forwarding the subsequent packet over the second network path to the second computer device.

17. A method as in claim 10 further comprising:
maintaining connection state information in a corresponding data communication device that adjusts the sequence information in the second packet, the corresponding data communication device tracking respective amounts of extra data inserted into respective data packets received from the first computer device over the first network path and forwarded over the second network path to the second computer device such that the first computer device is not aware that the corresponding data communication device adds extra data to the respective data packets.

18. A data communication device disposed in a network between a first computer device and a second computer device, the data communication device comprising:
at least one communications interface;
a memory;
a processor; and
an interconnection mechanism coupling the at least one communications interface, the memory, and the processor;
wherein the memory is encoded with a manager application that when performed on the processor, produces a manager process that causes the data communication device to support operations of:
receiving a first packet including original data being propagated from the first computer device to the second computer device for a communications session;
inserting a first amount of extra data into the first packet to alter the size of the first packet;
forwarding the first packet including the first amount of extra data to the second computer device; and
in response to receiving an acknowledgment message from the second computer device that the second computer device received the first packet including the original data as well as the first amount of extra data, adjusting sequence information stored in the acknowledgement message by subtracting a value equal to the first amount of extra data from sequence information stored in the acknowledgement message, transmitting a message to the first computer device indicating that the second computer device received the first packet, where the message comprises the modified acknowledgement message.

19. A data communication device as in claim 18, wherein transmitting the message occurs in response to receiving an acknowledgment message from the second computer device that the second computer device received the first packet including the original data as well as the first amount of extra data.

20. A data communication device as in claim 18, wherein transmitting the message includes:
in lieu of forwarding an acknowledgment received from the second computer device indicating that the second computer device properly received the original data as well as the first amount of extra data in the first packet, forwarding the message to the first computer acknowledging that the second computer device received the original data.

* * * * *

UNITED STATES PATENT AND TRADEMARK OFFICE
CERTIFICATE OF CORRECTION

PATENT NO. : 7,624,190 B1  Page 1 of 1
APPLICATION NO. : 11/297771
DATED : November 24, 2009
INVENTOR(S) : Aviani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Fourteenth Day of December, 2010

David J. Kappos
*Director of the United States Patent and Trademark Office*